United States Patent [19]

Lee

[11] Patent Number: 5,713,532
[45] Date of Patent: Feb. 3, 1998

[54] CAM GEAR FOR ACTUATING A REEL BRAKE MECHANISM IN A VIDEO CASSETTE RECORDER

[75] Inventor: Chang-Ho Lee, Seoul, DPR of Korea

[73] Assignee: Daewoo Electronics Co., Ltd., Seoul, Rep. of Korea

[21] Appl. No.: 639,415

[22] Filed: Apr. 29, 1996

[30] Foreign Application Priority Data

Apr. 29, 1995 [KP] DPR of Korea ............ 95-10598

[51] Int. Cl.$^6$ ............ G11B 15/32; G11B 15/00; G11B 15/46; G11B 15/18
[52] U.S. Cl. ............ 242/355; 242/333; 242/334.1; 360/71; 360/74.1
[58] Field of Search ............ 242/355, 333, 242/334.1; 360/71, 74.1

[56] References Cited

U.S. PATENT DOCUMENTS 4,899,951  2/1990  Okada et al. ............ 360/74.1 X
5,570,253  10/1996  Lee ............ 360/74.1 X Primary Examiner—John Q. Nguyen
Attorney, Agent, or Firm—Pennie and Edmonds, LLP

[57] ABSTRACT

A cam gear is provided with a camming groove including an inside camming face and an outside camming face. The inside camming face is divided into a stop mode inner-section of a first constant radius, a play mode inner-section of a second constant radius, the second constant radius being larger than the first radius, and a first transition section formed in a manner that an end of the stop mode inner-section is smoothly joined to a beginning of the play mode inner-section. The outside camming face is divided into a stop mode outer-section of a third constant radius, the third constant radius being larger than the first constant radius by a predetermined camming groove width, a play mode outer-section of a fourth constant radius, the fourth constant radius being larger than the second radius by the camming groove width, an intermediate mode outer-section of a fifth constant radius, the fifth constant radius being larger than the third constant radius and being smaller than the fourth constant radius, a second transition section formed in a manner that an end of the stop mode outer-section is smoothly joined to a beginning of the intermediate mode outer-section, and a third transition section formed in a manner that an end of the intermediate mode outer-section is smoothly joined to a beginning of the play mode outer-section.

6 Claims, 7 Drawing Sheets

CAM GEAR FOR ACTUATING A REEL BRAKE MECHANISM IN A VIDEO CASSETTE RECORDER

FIELD OF THE INVENTION

The present invention relates to a video cassette recorder (VCR); and, more particularly, to a VCR incorporating therein a cam gear for actuating a brake mechanism, which has an improved camming groove profile to reduce loads on a cam driving motor.

DESCRIPTION OF THE PRIOR ART

In general, a VCR is usually operated in various modes to record or reproduce video images. Such various modes include a play mode, a fast forward mode, a rewind mode and a review search mode. In the review search mode, the video images are reversely reproduced, with a magnetic tape being transported toward a supply reel.

If an operating mode is changed to another in VCR, components therein, particularly, a plurality of reel brake units, are rearranged to accommodate the mode change. The rearranging of the reel brake units is normally achieved by laterally moving a slide plate which is connected to a cam gear having a camming groove, through a cam follower.

There is illustrated in FIG. 1, a conventional cam and cam follower units of the VCR. The illustrated cam gear 15 has a camming groove 16 of a predetermined cam profile; and is rotated by a predetermined amount of angle by a driving motor 14 in every mode change.

Retained within the camming groove 16 is a pin 18 of a cam follower lever 17 which rectilinearly moves up and down in response to the rotation of the cam gear 15. The movement of the cam follower lever 17 causes a slide plate 19 to laterally move to and fro.

FIG. 2 shows an enlarged view of the cam profile of the camming groove 16. The cam profile approximated as a helical form is divided into a number of sections including a stop mode section $\Theta_1$ to $\Theta_2$ of a radius $R_1$, a review search mode section $\Theta_3$ to $\Theta_4$ of a radius $R_2$, and a play mode section $\Theta_5$ to $\Theta_6$ of a radius $R_3$, wherein $R_1$, $R_2$ and $R_3$ are constants, satisfying the relationship of $R_1<R_2<R_3$. A width W of the camming groove 16 is larger than a diameter of the pin 18 to thereby provide a backlash between the pin 18 and an inside and an outside camming faces 16a and 16b.

When the pin 18 moves along the camming groove 16, it comes into contact with the inside camming face 16a for the mode change from the stop mode to the play mode, while it follows the outside camming face 16b for the reversing mode change.

The cam profile described above can be represented by a graph shown in FIG. 3. The displacement of the pin 18 from the center C of the cam gear 15 remains to be constant at each mode section and varies rapidly in transition sections a and b between the modes. As a result, the load level of the driving motor 14 for the cam gear 15 is much higher in the transition sections a and b than that in the mode sections. Particularly, when the VCR mode is changed from the stop mode to the play mode, the current levels in the sections a and b becomes exceedingly higher, as illustrated in FIG. 4. The illustrated current variations are detected from the driving motor during the mode change of the VCR. The difference in the current level between the upper current level and the lower current level is so serious that a performance degradation of the driving motor and a reduction in the service life of the motor may result.

SUMMARY OF THE INVENTION

It is, therefore, a primary object of the invention to provide a cam gear having a cam profile designed to mitigate a load of a cam driving motor, thereby minimizing the current variation in the driving motor.

In accordance with the present invention, there is provided a cam gear with a camming groove for actuating a slide plate for a reel brake mechanism in a VCR, the cam gear being characterized in that: the camming groove comprises an inside camming face and an outside camming face, the inside camming face being divided into a stop mode inner-section of a first constant radius, a play mode inner-section of a second constant radius, the second constant radius being larger than the first radius, and a first transition section formed in a manner that an end of the stop mode inner-section is smoothly joined to a beginning of the play mode inner-section, and the outside camming face being divided into a stop mode outer-section of a third constant radius, the third constant radius being larger than the first constant radius by a predetermined camming groove width, a play mode outer-section of a fourth constant radius, the fourth constant radius being larger than the second radius by the camming groove width, an intermediate mode outer-section of a fifth constant radius, the fifth constant radius being larger than the third constant radius and being smaller than the fourth constant radius, a second transition section formed in a manner that an end of the stop mode outer-section is smoothly joined to a beginning of the intermediate mode outer-section, and a third transition section formed in a manner that an end of the intermediate mode outer-section is smoothly joined to a beginning of the play mode outer-section.

BRIEF DESCRIPTION OF THE DRAWINGS

The above and other objects and features of the present invention will become apparent from the following description of preferred embodiments, when given in conjunction with the accompanying drawings, in which.

DETAILED DESCRIPTION OF THE PREFERRED EMBODIMENTS

Figure 1:
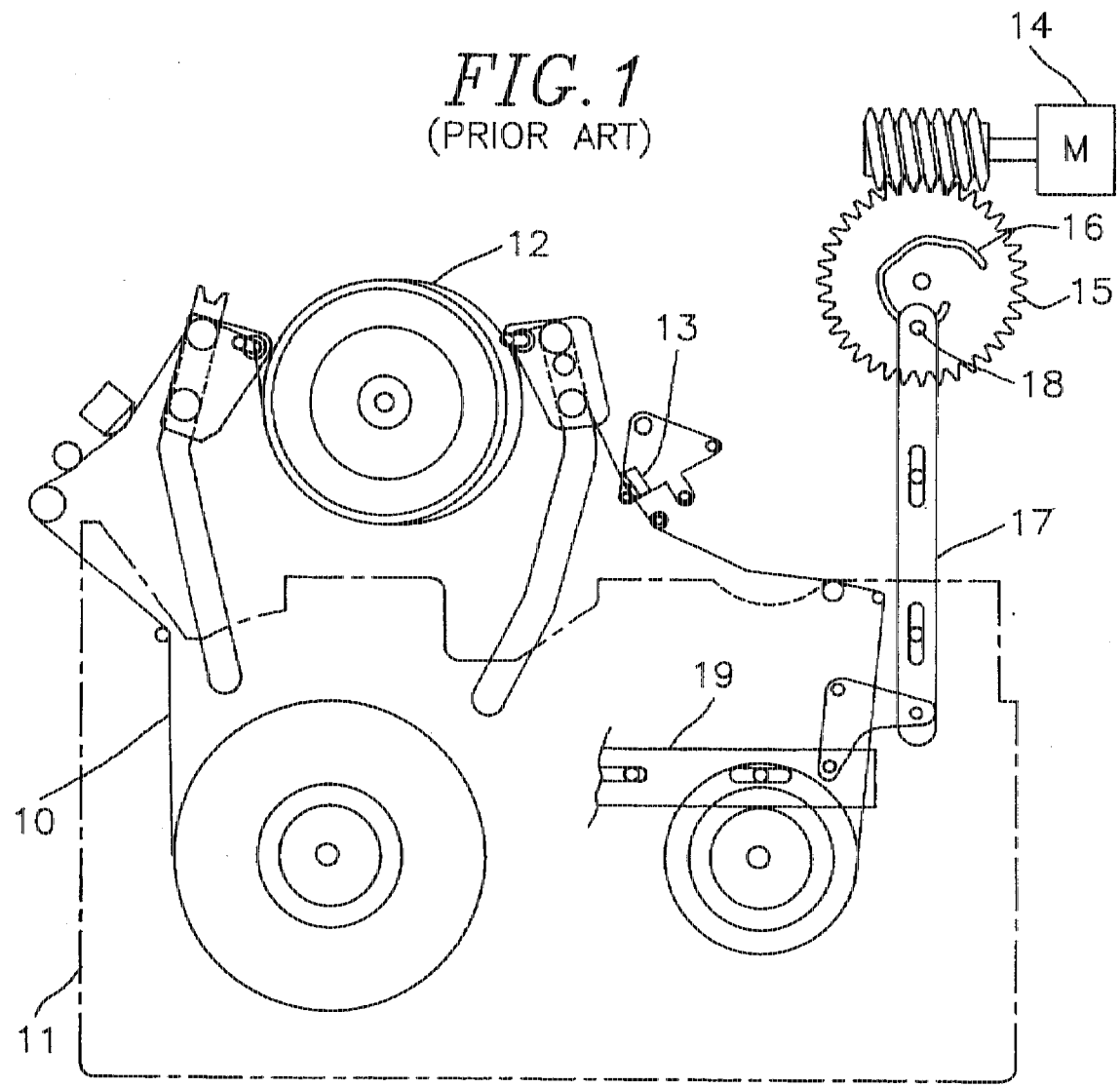
FIG. 1 shows a plan view of a deck mechanism of a prior art VCR incorporating therein a cam gear, a driving motor and a slider plate.
Figure 2:
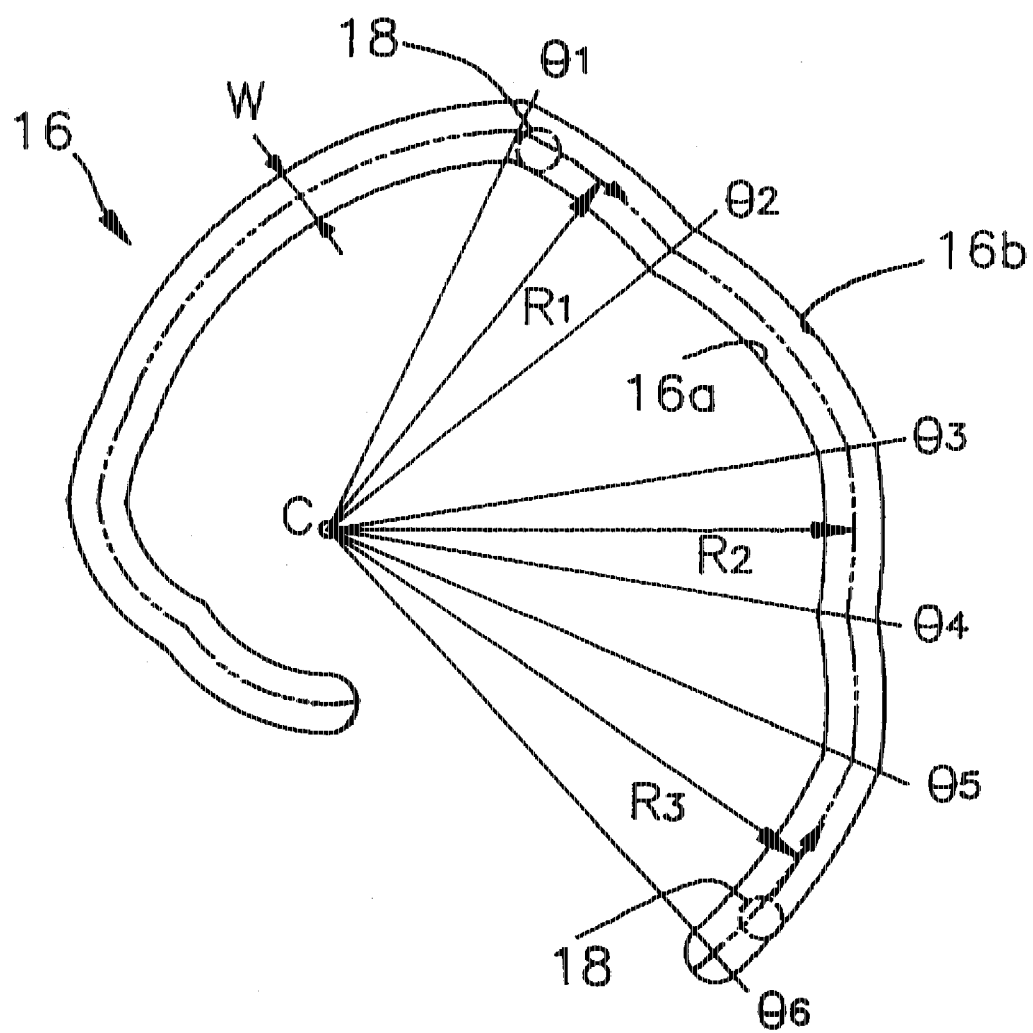
FIG. 2 illustrates a camming groove on the cam gear of the prior art VCR.
Figure 3:
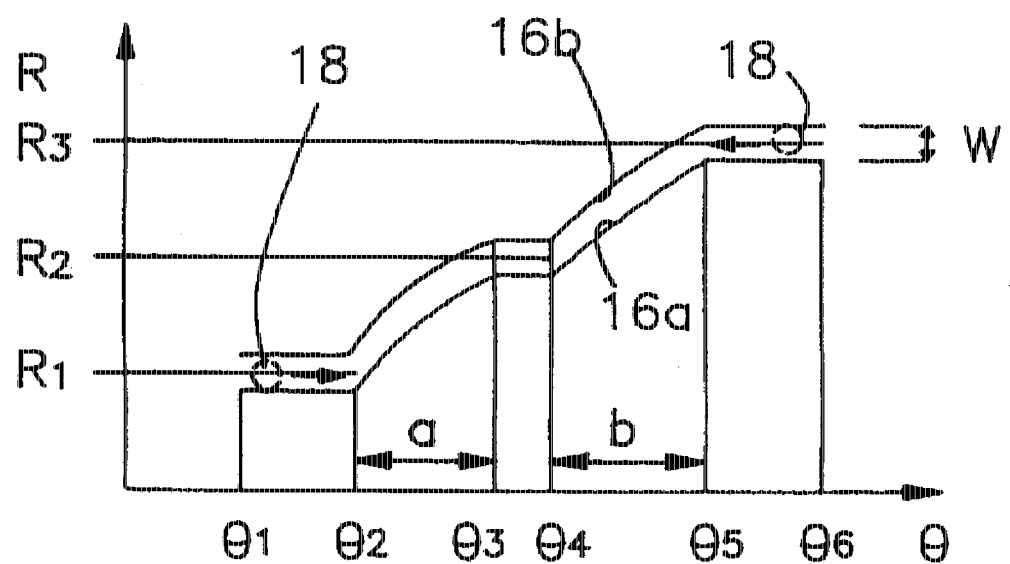
FIG. 3 is a camming profile of a section between a stop mode and a play mode in the prior art VCR.
Figure 4:
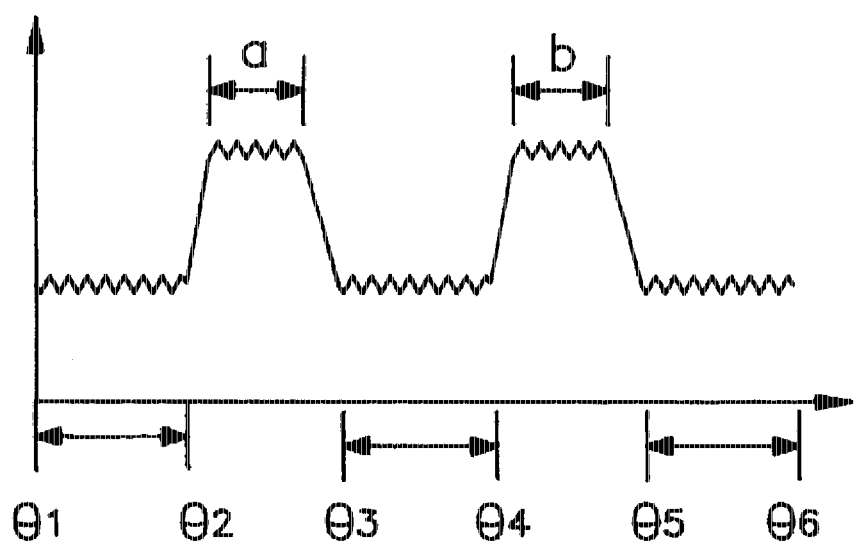
FIG. 4 presents current levels detected from the driving motor during a mode change from the stop mode to the play mode in the prior art VCR.

Although the main aspects of the inventive cam gear are shown in FIGS. 5 to 7, FIG. 1 will be from time to time referenced in describing the inventive cam gear. Furthermore, same reference numerals will be used to represent same components in FIGS. 1 and 5 to 7.

Figure 5:
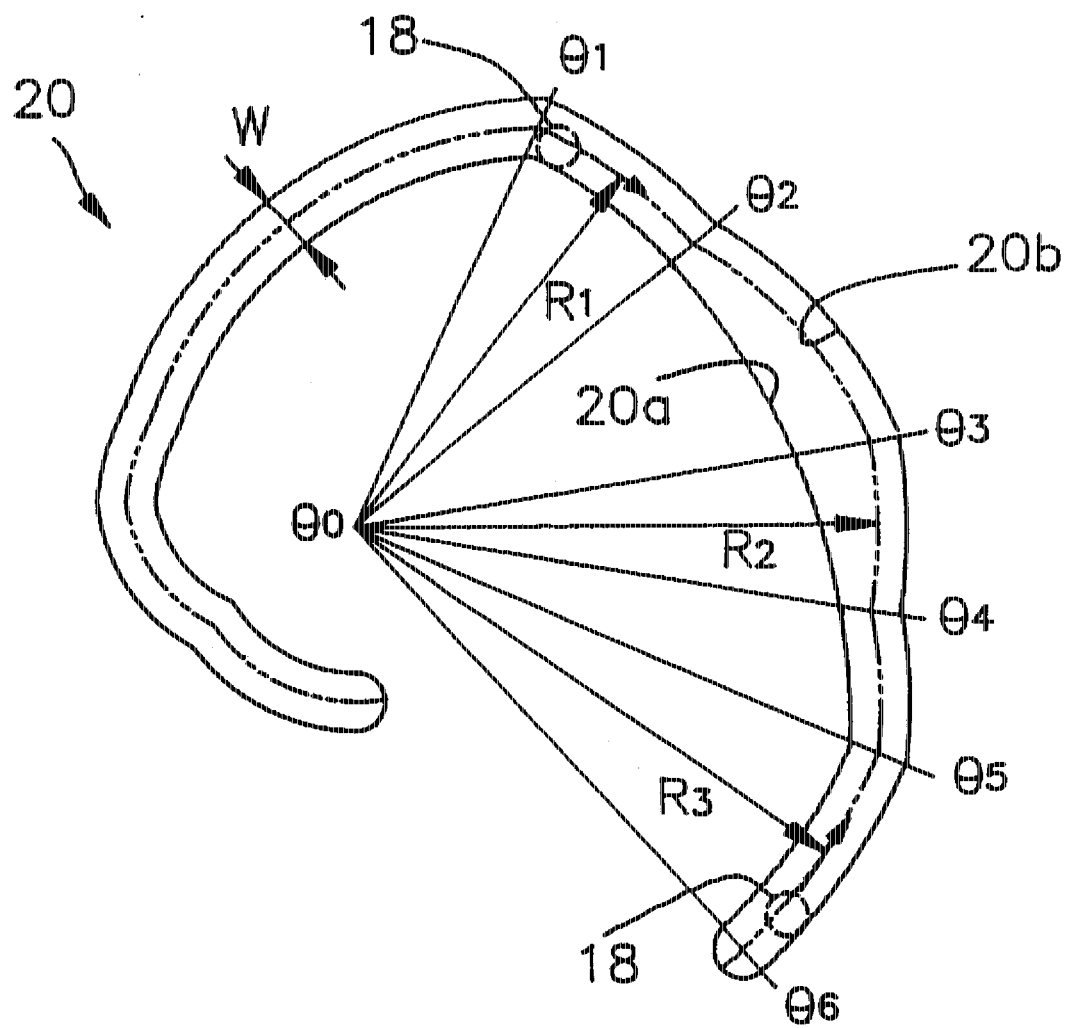
FIG. 5 offers a camming groove on a cam gear within a VCR in accordance with the present invention.

There is shown an enlarged view of a camming groove 20 on a cam gear in accordance with the present invention in FIG. 5. The camming groove 20 is of an approximate helical form which includes a stop mode section $\Theta_1$ to $\Theta_2$, a review search mode section $\Theta_3$ to $\Theta_4$, and a play mode section $\Theta_5$ to $\Theta_6$.

In each of the mode sections, the camming groove 20 maintains a constant radius $R_1$, $R_2$ and $R_3$, respectively. The radius $R_1$ is smaller than the radius $R_2$; and the radius $R_2$ is smaller than the radius $R_3$. The width W of the camming groove 20 is constant between the beginning of the groove $\Theta_0$ and the end of the stop mode section $\Theta_2$. The width W of the camming groove 20 in the play mode section $\Theta_5$ to $\Theta_6$ is also constant.

Figure 6:
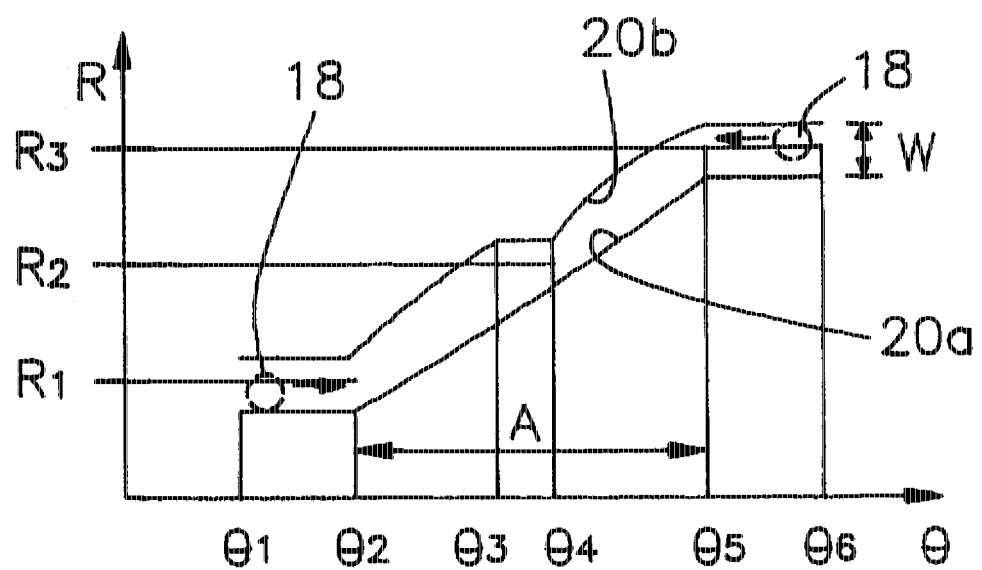
FIG. 6 depicts a camming profile of the camming groove in the inventive VCR.

Referring to FIG. 6, in accordance with the present invention, however, an inside camming face 20a has a radius which continuously increases with distance in a section A between the end of the stop mode section $\Theta_2$ and the beginning of the play mode section $\Theta_5$; whereas an outside camming face 20b is so formed as to maintain a required radius to carry out the VCR review mode. Therefore, the width W of the camming groove 20 in the section A is substantially larger than that in the other sections.

The pin 18 follows the inside camming face 20a when the current stop mode is changed to the play mode. On the other hand, the pin follows the outside camming face 20b, when the play mode is changed into the stop mode.

With this configuration, when the VCR is switched from the stop mode to the play mode, the pin 18 can smoothly and directly reach the play mode, following the inside camming face 20a, without being subjected to the unnecessary camming action of the review search mode cam profile.

Figure 7:
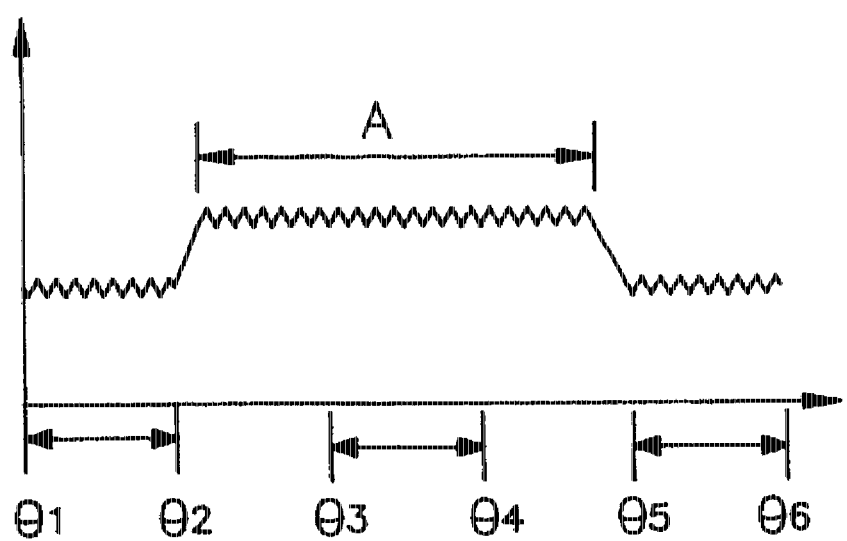
FIG. 7 sets forth a current variation detected from a driving motor during the inventive VCR mode change from a stop mode to a play mode.

FIG. 7 reveals a current variation detected from the driving motor 14 during the VCR mode change from the stop mode to the play mode. A current value in a transition section A appears to be higher than that shown in the remainder sections. However, the current value difference between the section A and the remainder is smaller than that for the prior art cam gear.

Although the invention has been shown and described with respect to the preferred embodiment, it will be understood by those skilled in the art that various changes and modifications may be made without departing from the spirit and scope of the invention as defined in the following claims.

What is claimed is:

1. In a video cassette recorder incorporating therein a cam gear with a camming groove of the type including at least three sections for three different operating modes of the video cassette recorder, respectively, the cam gear being adapted to be pivoted by a driving motor, a cam follower lever having a first end retained within the camming groove and a second connected to a slide plate for controlling a reel brake mechanism in the video cassette recorder, the improvement wherein:

said camming groove includes an inside camming face and an outside camming face, the inside camming face being divided into a first mode inner-section of a first constant radius, a second mode inner-section of a second constant radius, the second constant radius being larger than the first constant radius, and a first transition inner-section formed between the first and the second mode inner-sections and having a radius which continuously increases with distance from an end of the first mode inner-section to a beginning of the second mode inner-section, and the outside camming face being divided into a first mode outer-section of a third constant radius positioned opposite said first mode inner-section, the third constant radius being larger than the first constant radius by a predetermined camming groove width, a second mode outer-section of a fourth constant radius positioned opposite said second mode inner-section, the fourth constant radius being larger than the second radius by the camming groove width, a third mode outer-section of a fifth constant radius, the fifth constant radius being larger than the third constant radius and being smaller than the fourth constant radius, a second transition section formed between the first and the third mode outer-sections having a radius which continuously increases with distance from an end of the first mode outer-section toward a beginning of the third mode outer-section, and a third transition section formed between the third and the second mode outer-sections which continuously increases with distance from an end of the third mode outer-section toward a beginning of the second mode outer-section, said third mode outer-section and second and third transiton sections being positioned between said first mode outer-section and said second mode outer-section, in order to allow the cam follower lever to dispense with being subjected to a camming action for the third mode when a mode of the video cassette recorder is directly changed from the first mode to the second mode.

2. The video cassette recorder of claim 1, wherein the third mode outer-section is for a review search mode of the video cassette recorder.

3. The video cassette recorder of claim 1, wherein the first mode inner-section and the first mode outer-section are for a play mode of the video cassette recorder; and the second mode inner-section and the second mode outer-section are for a stop mode of the video cassette recorder.

4. The video cassette recorder of claim 1, wherein the first mode inner-section and the first mode outer-section are for a stop mode of the video cassette recorder; and the second mode inner-section and the second mode outer-section are for a play mode of the video cassette recorder.

5. The video cassette recorder of claim 1, wherein the third mode outer-section is for a fast forward and a rewind mode of the video cassette recorder.

6. A video cassette recorder comprising a motor operatively engaged to a cam gear, said cam gear having a camming groove formed therein and adapted to receive one end of a cam follower lever for switching among at least three operating modes, said camming groove having an inside camming face and an outside camming face wherein said inside camming face comprises:
a first mode inner-section having a first constant radius;
a second mode inner-section having a second constant radius greater than said first constant radius; and
a first transition section therebetween, said first transition section having a radius which continuously increases with distance from said first mode inner-section to said second mode inner-section; and said outside camming face comprises:
a first mode outer-section having a third constant radius greater than said first constant radius and being positioned opposite said first mode inner-section;
a second mode outer-section having a fourth constant radius greater than said second constant radius and being positioned opposite said second mode inner-section;
a third mode outer-section between said first and second mode outer-sections, said third mode outer-section having a fifth constant radius which is larger than said third constant radius and smaller than said fourth constant radius;

a second transition section between said first mode outer-section and said third mode outer-section, said second transition section having a radius which continuously increases with distance from said first mode outer-section to said third mode outer-section; and a third transition section between said third mode outer-section and said second mode outer-section, said third transition section having a radius which continuously increases with distance from said third mode outer-section to said second mode outer-section, said third mode outer-section and said second and third transition sections being positioned between said first mode outer-section and said second mode outer-section.

* * * * *